(12) United States Patent
Park

(10) Patent No.: US 9,578,623 B2
(45) Date of Patent: Feb. 21, 2017

(54) SYSTEM AND METHOD FOR MOBILE BROADCAST SERVICE, CONTROLLER AND METHOD FOR DRIVING CONTROLLER

(75) Inventor: Dae-Geun Park, Daejeon (KR)

(73) Assignee: Electronics and Telecommunications Research Institute, Deajeon (KR)

(\*) Notice: Subject to any disclaimer, the term of this patent is extended or adjusted under 35 U.S.C. 154(b) by 449 days.

(21) Appl. No.: 14/130,458

(22) PCT Filed: Jun. 20, 2012

(86) PCT No.: PCT/KR2012/004855
§ 371 (c)(1),
(2), (4) Date: Dec. 31, 2013

(87) PCT Pub. No.: WO2013/009012
PCT Pub. Date: Jan. 17, 2013

(65) Prior Publication Data
US 2014/0133383 A1    May 15, 2014

(30) Foreign Application Priority Data

Jul. 13, 2011   (KR) .................. 10-2011-0069647

(51) Int. Cl.
*H04W 72/00* (2009.01)
*H04L 12/18* (2006.01)
*H04W 4/08* (2009.01)

(52) U.S. Cl.
CPC .......... *H04W 72/005* (2013.01); *H04L 12/185* (2013.01); *H04L 12/1845* (2013.01); *H04W 4/08* (2013.01); *H04L 12/189* (2013.01)

(58) Field of Classification Search
CPC ............... H04L 12/1845; H04L 12/185; H04L 29/06455; H04L 45/16; H04L 47/15; H04L 47/806; H04L 49/201; H04L 65/4076; H04L 67/1044; H04W 4/06; H04W 4/08; H04W 72/121; H04W 72/005
See application file for complete search history.

(56) References Cited

U.S. PATENT DOCUMENTS

2008/0037460 A1   2/2008 Venkatachalam
2008/0069019 A1   3/2008 Fahldieck
(Continued)

FOREIGN PATENT DOCUMENTS

KR   1020090039223 A   4/2009

OTHER PUBLICATIONS

Jeff Mandin et al., "MBS (Multicast and Broadcast Service) enhanced for macro-diversity reception," IEEE 802.16 Broadband Wireless Access Working Group, Aug. 2004, pp. 0-6, IEEE.
(Continued)

*Primary Examiner* — Benjamin H Elliott, IV
(74) *Attorney, Agent, or Firm* — William Park & Associates Ltd.

(57) ABSTRACT

The present invention relates to a system and a method for a mobile broadcast service, a controller, and a method for driving the controller. The system for a mobile broadcast service forms an MBS zone only with base stations having user demand for an MBS. For example, when there is a request for an MBS from a base station, if an MBS zone already exists which is providing the requested MBS, then the corresponding base station is included in the previously generated MBS zone. In contrast, if there are no more users using an MBS via a base station that is part of an MBS zone, then the base station in question is excluded from the MBS zone. Thus, an MBS zone can be dynamically formed by including or excluding a base station, forming an MBS zone, on the basis of an existence of an MBS user.

20 Claims, 7 Drawing Sheets

(56) References Cited

U.S. PATENT DOCUMENTS

| | | | |
|---|---|---|---|
| 2010/0034129 A1 | 2/2010 | Chen et al. | |
| 2010/0278091 A1* | 11/2010 | Sung | H04W 4/08 |
| | | | 370/312 |
| 2011/0064016 A1* | 3/2011 | Kim | H04L 12/189 |
| | | | 370/312 |
| 2012/0163272 A1* | 6/2012 | Chung | H04W 4/06 |
| | | | 370/312 |
| 2013/0016645 A1* | 1/2013 | Moriwaki | H04L 12/185 |
| | | | 370/312 |
| 2014/0133383 A1* | 5/2014 | Park | H04L 12/185 |
| | | | 370/312 |

OTHER PUBLICATIONS

Ji Hoon Lee et al., "Reducing Handover Delay by Location Management in Mobile WiMAX Multicast and Broadcast Services," IEEE Transactions on Vehicular Technology, Feb. 2011, vol. 60, No. 2, IEEE.

* cited by examiner

FIG. 3

| MBS IDENTIFIER | USER IDENTIFIER | ACCESS NODE IDENTIFIER/NUMBER OF USERS OF MBS ZONE MEMBER BASE-STATION |
|---|---|---|
| MBS_α | Alice | BTS_A / 2 |
| | ... | ... |
| | Tom | BTS_A / 5 |
| MBS_Ω | John | BTS_A / 8 |
| | ... | ... |
| ... | | |

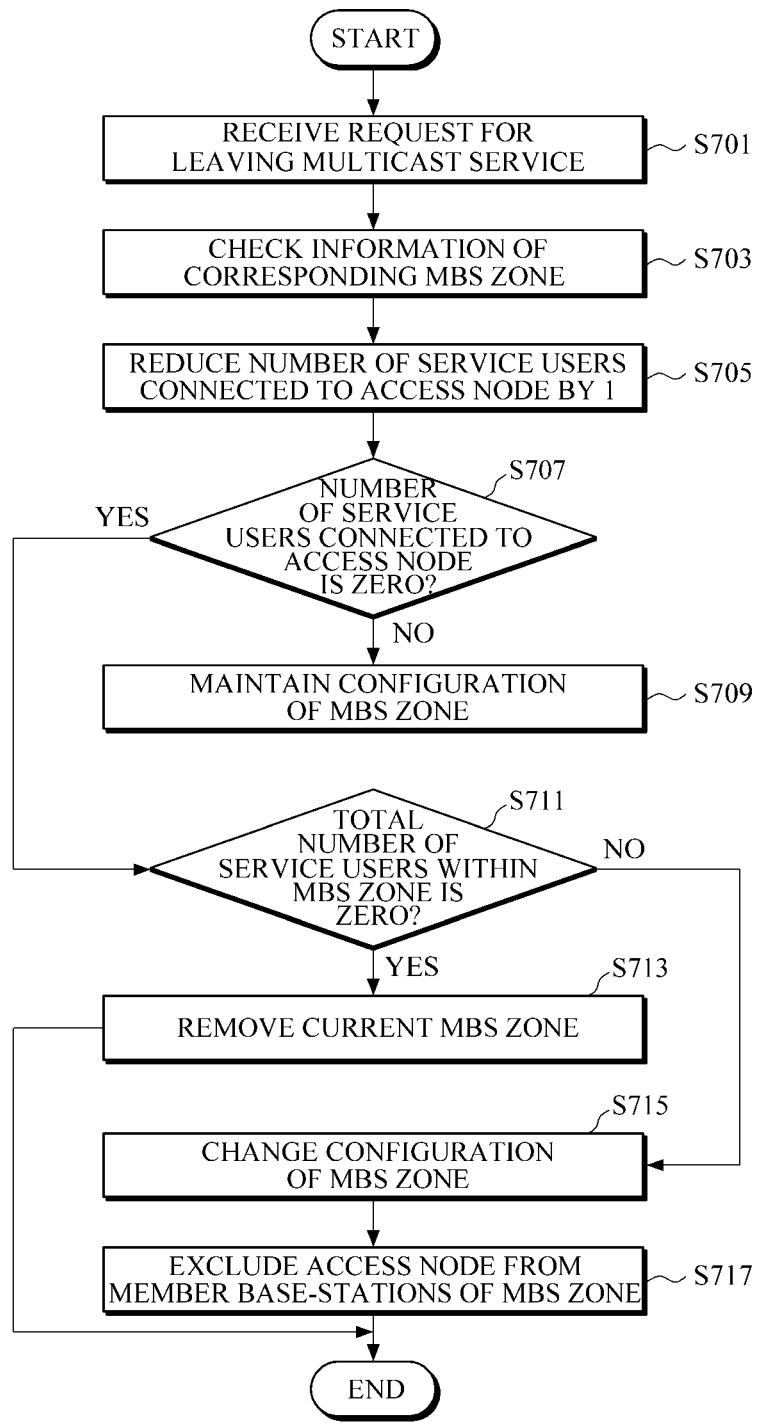

SYSTEM AND METHOD FOR MOBILE BROADCAST SERVICE, CONTROLLER AND METHOD FOR DRIVING CONTROLLER

TECHNICAL FIELD

The following description relates to a method and system for providing a mobile broadcast service, and a controller and an operating method thereof. More particularly, a method and system for providing a mobile broadcast service, and a controller and an operating method thereof are implemented to dynamically manage a multicast service area, such as a multicast/broadcast service (MBS) zone, by creating the multicast service area based only on an access node that a multicast service user accesses and by removing from the multicast service area an access node that no multicast service user accesses in, for example, a mobile communication system that provides a multicast/broadcast service.

BACKGROUND ART

Wireless broadcast service has gained popularity as one of the most typical mobile communication services. The mobile broadcast service may be unicasted from a broadcast server to a subscriber through 1-to-1 communication, or may be multicasted/broadcasted from a broadcast server to a number of subscribers through 1-to-N communication.

When compared to a wired communication service, a mobile communication service allows only a small amount of resources to be allocated among subscribers, and thus a communication fee is much more expensive than the wired communication service. Hence, it may be desirable for a mobile communication system to employ a multicast/broadcast service (MBS) that enables to deliver the same broadcast content to many users in parallel by use of one resource.

To this end, standardization specifications, such as IEEE802.16e, IEEE802.16m, 3GPP/LTE and Worldwide Interoperability for Microwave Access (WiMAX) forum, suggest an MBS which is named an Enhanced-MBS (E-MBS), a Multicast Broadcast Multimedia Service (MBMS), an Enhanced-MBMS (E-MBMS), or a MultiCast BroadCast Service (MCBCS) in a single-frequency network environment.

According to MBS specifications provided by IEEE802.16e or IEEE802.16m, a plurality of base-stations are included in one broadcast service area and all base-stations in the same broadcast service area deliver broadcast content to terminals using the same wireless resource. IEEE802.16e or IEEE802.16m defines this MBS broadcast area as an MBS zone or an E-MBS zone. FIG. 1 illustrates an example of MBS zones specified by IEEE 802.16e or IEEE802.16m.

For the implementation of MBS, all users within the same cell should be able to receive service data. Thus, a base-station that delivers the MBS needs to generate an MBS data signal by taking into consideration users' locations, for example, a boundary of each cell, where the proper reception of the MBS data signal is difficult. Accordingly, it may not be possible to provide the MBS at a service quality as provided by a unicast service. However, to overcome these drawbacks, the standardization specifications define enhancement of an MBS reception quality by use of macro-diversity. The effects of macro-diversity increase as more adjacent base-stations are transmitting the same signal.

As discussed above, it may be understood that it is difficult to create an MBS zone that completely meet a service request by a user that is moving in a fixed MBS environment. Especially, in a fixed MBS environment, wireless resources for the MBS are always needed to be allocated to access nodes or base-stations, which are not connected to MBS users, and this significantly wastes the wireless resources. Further, a single base-station (BS) MBS specified by IEEE 802.16e forms an MBS zone by a single base-station and thus can use wireless resources most efficiently, but cannot obtain macro-diversity effects so that a quality of the MBS is deteriorated. Hence, there arises a need for a new method to enhance a quality of MBS while reducing an amount of wireless resources used by a base-station for the provision of the MBS.

DETAILED DESCRIPTION OF THE INVENTION

Technical Problem

One objective of the present invention is to provide a system and a method for a mobile broadcast service, a controller, and a method for driving the controller. The system for a mobile broadcast service, according to one aspect of the present embodiment, forms an MBS zone only with base stations having user demand for an MBS. For example, when there is a request for an MBS from a base station, if an MBS zone already exists which is providing the requested MBS, then the corresponding base station is included in the previously generated MBS zone. In contrast, if there are no more users using an MBS via a base station that is part of an MBS zone, then the base station in question is excluded from the MBS zone. Thus, an MBS zone can be dynamically formed by including or excluding a base station, forming an MBS zone, on the basis of an existence of an MBS user.

Technical Solution

In one general aspect, there is provided a system for a mobile broadcast service comprising: a content server configured to provide data and service information which are related to at least one mobile service of a multicast/broadcast service (MBS); a node apparatus configured to reserve a dedicated wireless channel to transmit data in response to a request from a user for the mobile service, and to transmit multicast data using the dedicated wireless channel; a gateway configured to perform data tunneling to the node apparatus for an access to the MBS, to request for setting or unsetting of a wireless channel between the node apparatus and a terminal of the user, and to control data synchronization of the node apparatus in a service zone in which the MBS is activated; and a controller configured to manage at least one of a service access to the gateway for transmitting the data, a group of node apparatuses, and profiles of the user and the service and to distribute the data and the service information to the gateway.

In another general aspect, there is provided a controller comprising: an activation determining unit configured to determine whether a mobile service requested by a first terminal or a second terminal is activated when the first terminal or the second terminal requests for the mobile service by accessing a mobile communication network, and to further determine whether the mobile service requested by the second terminal has already been activated in a mobile service transmission zone and the second terminal is operating in the same service area where the first terminal resides; a service zone creating unit configured to, in response to a determination being made that the mobile service requested by the first terminal is not activated, create a first service area for the first terminal, and to, in response to a determination being made that the second terminal is operating in the same service area where the first terminal resides, extend the first service area to create a second service area; and a path determining unit configured to set data paths to a first node apparatus and to a second node apparatus for the mobile service.

In another general aspect, there is provided a method for a mobile broadcast service in a system comprising a node apparatus, a gateway, a controller and a content server so as to process data and service information which are related to at least one mobile service of a multicast/broadcast service (MBS), the method comprising: reserving, at the node apparatus, a dedicated wireless channel to transmit data to a user in response to a request from the user for the mobile service and transmitting multicast data over the dedicated wireless channel; performing, at the gateway, data tunneling to the node apparatus for an access to the MBS, requesting for setting or unsetting of a wireless channel between the node apparatus and a terminal of the user, and controlling data synchronization of the node apparatus in a service zone in which the MBS is activated; and managing, at the controller, at least one of a service access to the gateway for transmitting the data, a group of node apparatuses, and profiles of the user and the service and distributing the data and the service information to the gateway.

In another general aspect, there is provided a method for a mobile broadcast service in a system comprising a node apparatus, a gateway, a controller and a content server so as to process data and service information which are related to at least one mobile service of a multicast/broadcast service (MBS), the method comprising: receiving, at the controller, a request from a user to join or leave the mobile service, determining creation, change, maintaining, or removal of a service zone in which the MBS is activated in response to the received request, and determining whether to allow the node apparatus to join or leave the mobile service; setting or unsetting, at the controller, a service distribution tree to distribute the MBS to the gateway and issuing a notification of creation, change, maintaining, or removal of the service zone; transmitting, at the gateway, synchronization rules related to the MBS to the node apparatus, setting or unsetting a service distribution tree to distribute the MBS to the node apparatus, issuing a request for registration or deregistration of a data path to the node apparatus or a request for allocation or deallocation of a channel resource and receiving a response to the request for registration or deregistration of the data path or a response to the request for allocation or deallocation of the channel resource; allocating or deallocating, at the node apparatus, the channel resource for the MBS, and issuing a request to a terminal of the user for setting or unsetting of channel connection and receiving a response to the request for setting or unsetting of the channel connection; and relaying, at the controller, the data from the content server to the terminal.

In another general aspect, there is provided a method for a mobile broadcast service in a system comprising a node apparatus, a gateway, a controller and a content server so as to process data and service information which are related to at least one mobile service of a multicast/broadcast service (MBS), the method comprising: in response to receiving a request from a first terminal for the MBS, creating, at the controller, a first service area based on decision rules, and issuing a notification of the creation of the first service area to the gateway; in response to receiving the notification of the creation of the first service area, distributing, at the gateway, synchronization rules to a first node apparatus, and making an access to the first node apparatus to transmit the data; and in response to receiving the synchronization rules, reserving, at the first node apparatus, a wireless link according to the synchronization rules and making an access to the gateway to receive the data.

In another general aspect, there is provided a method for driving a controller, comprising: determining whether a mobile service requested by a first terminal or a second terminal is activated when the first terminal or the second terminal requests for the mobile service by accessing a mobile communication network, and further determining whether the mobile service requested by the second terminal has already been activated in a mobile service transmission zone and the second terminal is operating in the same service area where the first terminal resides; in response to a determination being made that the mobile service requested by the first terminal is not activated, creating a first service area for the first terminal, and in response to a determination being made that the second terminal is operating in the same service area where the first terminal resides, extending the first service area to create a second service area; and setting data paths to a first node apparatus and to a second node apparatus for the mobile service.

In another general aspect, there is provided a method for driving a controller that interconnects with a node apparatus to process data and service information which are related to at least one mobile service of a multicast/broadcast service (MBS), the method comprising: receiving a request from a terminal to join the mobile service, and determining whether the requested mobile service is the MBS that is currently provided; in response to a determination being made that the requested service is the currently provided MBS, further determining whether the node apparatus is a member apparatus that forms a service zone in which the MBS is provided; in response to a determination being made that the node apparatus is the member apparatus of the service zone, storing identification information of the terminal and increasing a number of users of the node apparatus for the MBS.

In another general aspect, there is provided a method for driving a controller that interconnects with a node apparatus to process data and service information which are related to at least one mobile service of a multicast/broadcast service (MBS), the method comprising: receiving a request from a terminal(s) to leave the mobile service, and checking information of a service zone, in which the MBS is provided, based on the request; reducing a number of service users to be provided with the MBS through the node apparatus by a number of the terminals, each issuing the request to leave the mobile service, according to the checking result, and determining whether the number of the service users is zero; in response to a determination being made that the number of the service users is zero, further determining whether a total number of service users within the service zone is zero; in response to a determination being made that the total number of service users is not zero, changing a configuration of the service zone and excluding the node apparatus from member apparatuses for the provision of the MBS.

Advantageous Effects

According to the embodiments as described above, a base-station that forms an MBS zone is dynamically changed to another according to whether a user joins or leaves a multicast service, so that an MBS can be provided to all MBS users within the same MBS zone using a relatively small amount of wireless resources, compared to a method of configuring a multicast service area with a fixed shape.

Further, if a plurality of base-stations form an MBS, it is possible to increase an MBS reception quality using macro diversity, as used in a fixed MBS zone.

DESCRIPTION OF DRAWINGS

FIG. 3 is a diagram illustrating an example of a multicast broadcast service (MBS information table of a controller shown in FIG. 2.

FIG. 7 is a flowchart illustrating an example of an operating process of the controller shown in FIG. 2.

MODE FOR INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It is understood that although terms such as a first, a second, A, B, (a), (b) may be used herein to describe various elements and/or components, these elements and/or components should not be limited by these terms. These terms may be only used for the purpose of distinguishing one element or component from another element or component. Thus, an element or a component designated as "first" discussed below may be construed an element or a component designated as "second" without departing from the teachings of the present invention.

It is understood that when one element or component is described as being "connected to" or "coupled to" or "access" another element or component, it can be directly connected or coupled to, or access the other element or component, or intervening elements or components may be present.

Figure 1:
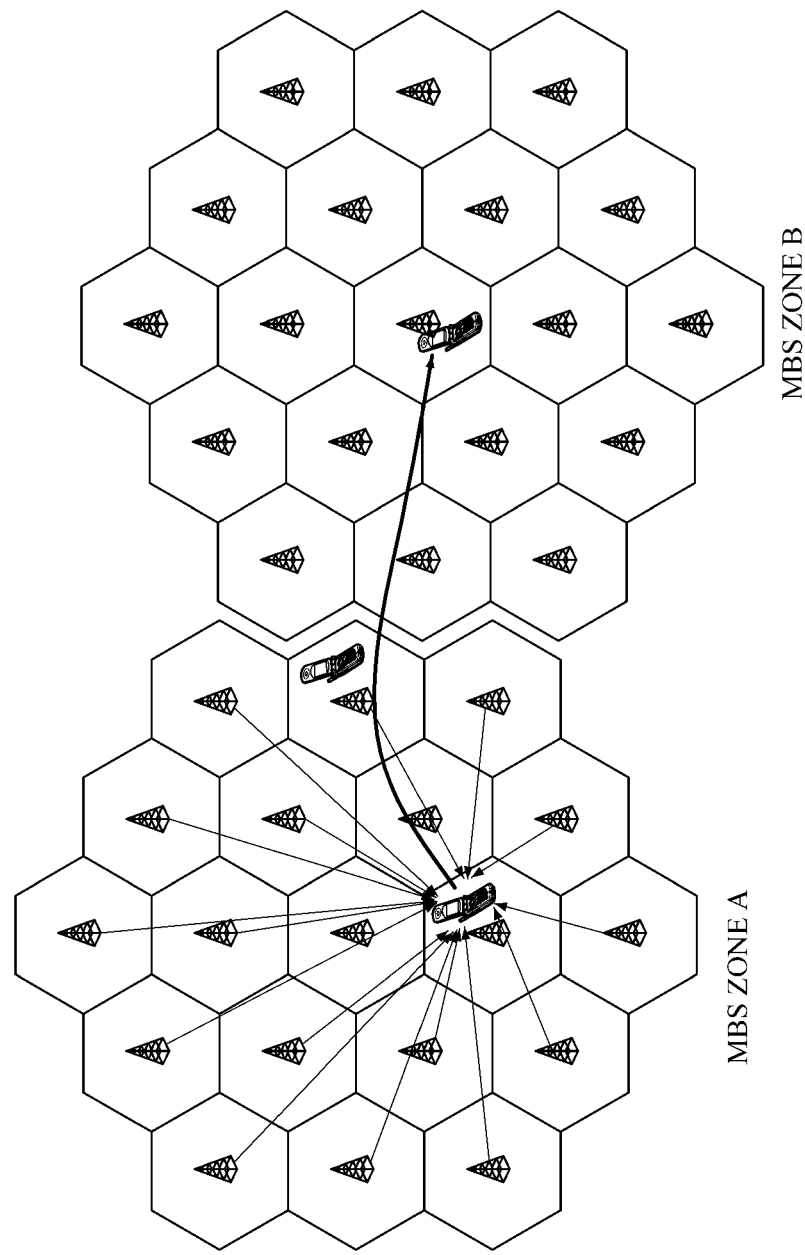
FIG. 1 is a diagram illustrating an example of MBS zones specified by IEEE 802.16e or IEEE802.16m.
Figure 2:
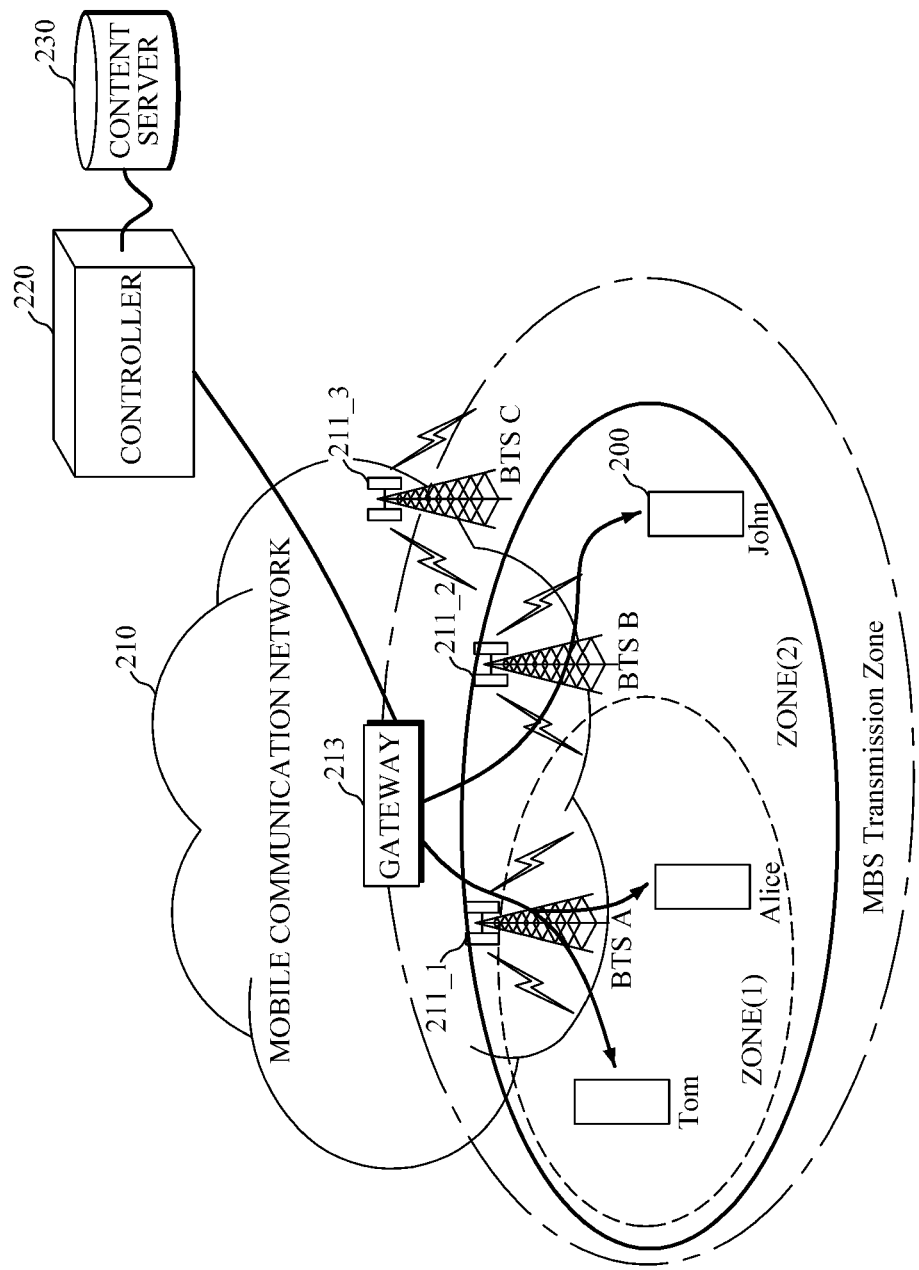
FIG. 2 is a diagram illustrating an example of a system for a mobile broadcast service according to an exemplary embodiment of the present invention.

FIG. 2 illustrates an example of a system for a mobile broadcast service according to an exemplary embodiment of the present invention, and FIG. 3 illustrates an example of a multicast broadcast service (MBS) information table of a controller shown in FIG. 2.

Referring to FIG. 2, a system for a mobile broadcast service includes some or all of a terminal 200, a mobile communication network 210, a controller 220 and a content server 230.

The terminal 200 may be applied to a variety of wired/wireless communication environments, and may include a different types of terminals, such as a personal digital assistant, a cellular phone, and a smart phone, and terminals of different communication schemes, such as a personal communication service phone, a global system for mobile phone, a Wideband CDMA (W-CDMA) phone, a CDMA-2000 phone, a mobile broadband system (MBS) phone, and a long term evolution (LTE) phone. The MBS phone is considered as a new terminal for a next-generation system. In addition, the terminal 200 may further include a desktop computer, a laptop computer, a net-book and tablet PC, and cloud terminals used under a cloud computing environment.

The terminal 200 may generally include a wireless communication module and a wireless LAN module, and may further include a global positioning system (GPS) module. The terminal 200 may access the wireless communication network 210 via the wireless communication module and perform a general voice or data communication with another terminal. In addition, the terminal 200 may use the wireless local area network (LAN) module to access the mobile communication network 210 via a detected nearby access point (AP) and receive diverse web page data. Further, the terminal 200 may use the GPS module to receive data provided through a GPS satellite.

The terminal 200 accesses the Internet over the wireless communication network 210 through wireless application protocol (WAP), Microsoft Internet Explorer (MIE) based on HTML in use of HTTP protocol, handheld device transport protocol (HDPT), i-Mode from NTT DoKoMo, Inc. or any other wireless accessing browsers. Amongst various types of Internet access protocols, MIE uses m-HTML that combines external resources with HTML content, and an i-mode terminal uses compact HTML (cHTML) which is a subset of HTML.

The terminal 200, for example, a smartphone, may use a wireless Internet access browser of a particular communication service provider, such as Opera Mini browser for the iPhone, or use a local area network, such as WiFi or WiBro, in conjunction with the particular Internet access browser in an effort to provide faster wireless Internet.

Further, the terminal 200 may be connected to a service delivery network through wireless resources allocated by base-stations BTS A, BTS B, and BTS C. The terminal 200 may request the service delivery network for an MBS, or receive an MBS that is currently delivered in an MBS zone, and display the MBS on a display of the terminal 200. The service delivery network is a network that connects a number of servers required for the provision of the MBS. For example, in addition to the content server 230 as shown in FIG. 2, an authentication server, an electronic program guide (EPG) server and the like may be further connected to the service delivery network.

The mobile communication network 210 may include a CDMA network, a WCDMA network, an evolved packet core (EPC) network, a Global System for Mobile Communication (GSM) network, and any future access networks for a next-generation mobile communication system, for example, a cloud computing network under a cloud computing environment. For example, the WCDMA network may include a repeater (not shown), Node B, a radio network controller (RNC), a mobile switching center (MSC)/visitor location register (VLR) and a serving GPRS support node (SGSN). In this example, the RNC functions to relay voice or data calls between a node B and an MSC/VLR or between a node B and an SGSN. The Node B and the RNC for the WCDM network may, respectively, correspond to a base station transmission system (BTS) and a base station controller (BSC) for a CDMA network. The node B and the RNC may be, respectively, equivalent to an e-Node B and a mobility management entity (MME) for the EPC network. An MME incorporates functionalities of an RNC and an MSC/VLR for the WCDMA network, and thus can perform substantially the same functions as the RNC and the MSC/VLR.

Hereinafter, a base-station will be taken as an example. For convenience of explanation, a serving base-station, a first base-station, and a service node device may refer to the same or similar element, and a member base-station, a second base-station, and a second node device may also refer to the same or similar element. However, when the first base-station indicates a base-station that issues a request for a service at a current position of the user's terminal 200, the service base-station may include a base-station that provides a service which the terminal 200 is currently accessing.

The base-stations BTS A, BTS B, and BTS C shown in FIG. 2 are located, for example, on a cell-by-cell basis. The each base-station BTS A, BTS B, and BTS C receives a call or data request signal from the terminal 200 through a traffic channel of signal channels, and transmits the received call request signal to a BSC or uses the received call request to recognize and register a location of the terminal 200 in the cell under charge of the base-station. Each base-station BTS A, BTS B, and BTS C recognizes a location of the terminal 200 that resides in the cell under charge of the base-station and transmits to the terminal 200 a call request signal that is delivered from the MSC through the BSC. The base-stations BTS A, BTS B, and BTS C are endpoint devices that are connected directly to the terminal 200, and perform baseband signal processing, conversion between wired and wireless signals, transmission and reception of wireless signals.

In addition, each base-station BTS A, BTS B, and BTS C may use a signal from a GPS satellite to acquire information of the latitude and longitude of the base-station, and transmit the location information of the base-station BTS A, BTS B, and BTS C to the terminal 200 through a system parameter message over a forward-link paging channel. The terminal 200 may use the location information of the base-station BTS A, BTS B, or BTS C in which the terminal 200 resides to calculate a moving distance of the terminal 200, thereby allowing the base-station to register new location information. Here, by registering the location of the terminal 200, information of the terminal 200, such as a location, a status, an identifier, a slot interval, and the other characteristics are informed to the MSC through the base-stations BTS A, BTS B, and BTS C. In addition, through the location registration, the terminal 200 may be effectively called out when the base stations BTS A, BTS B, and BTS C sets a receiving signal of the terminal 200. The registration of the location of the terminal 200 may be carried out when terminal 200 is powered on or off, when the terminal 200 moves from one MSC to another, or when a parameter of the terminal 200 is changed.

Further, the base-stations BTS A, BTS B, and BTS C reserve a wireless channel dedicated for transmitting multicast service data under the control of the controller 220, and transmit the multicast data to the terminal 200 over the dedicated wireless channel.

The gateway 213 may be a repeater, an RNC, a BSC, a GGSN, or a MME within the mobile communication network 210. The gateway 213 performs data tunneling to the base-stations BTS A, BTS B, and BTS C for service access. In addition, the gateway 213 controls synchronization for multicast to one of the base-stations BTS A, BTS B, and BTS C within a service area. More specifically, by interconnecting with a service base-station 211_1 and a member base-station 211_2, the gateway 213 performs MBS synchronization rules, data path registration and/or deregistration request, setting or unsetting of a multicast distribution tree, data path registration and/or deregistration response, channel resource allocation and/or deallocation request, and channel resource allocation and/or deallocation response. The setting or unsetting of the distribution tree may imply registration or deregistration of a multicast address according to standard protocol specifications.

The controller 220 may be a closed user group service controller that provides a mobile service, for example, a multicast/broadcast service, to a limited number of users within a specific area. The controller 220 manages a data delivery path through which data is transmitted from the terminal 200 connected to a particular base-station BTS A, BTS B, or BTS C to the content server 230 present in the service delivery network for MBS broadcasting, or through which data provided from the content server 230 is transmitted to the terminal 200 present in an MBS zone. The controller 220 manages a multicast group and a user/service profile to provide a wired/wireless multicast/broadcast service in a wired/wireless network environment, controls service access between the gateway 213 and the controller 220, and distributes service data and service information provided from the content server 230. Here, the service information may be information related to an identifier or an address of content.

The controller 220 may create a service area, that is, a service zone, in accordance with decision rules each time of receiving a request from a user to participate in a multicast service. The decision rules of the controller 220 may be made in various ways according to the purpose of design. Once a zone has been formed, the member base-stations (e.g., 211_2) are enabled to transmit multicast data to the users over the same physical multicast channel. If all users of the terminals connected to the member base-stations stop using the multicast service, the member base-stations releases the reserved multicast channel and leaves the zone for the multicast service. Then, when all member base-stations have left the zone, the zone may be removed. A multicast transmission zone (MTZ) is a group of base-stations that can participate in the same multicast service. The MTZ is designed by taking into account content synchronization, and a zone is formed within the MTZ. Here, the zone is a service area for a multicast service, and includes one or more base-stations, this so-called "member base-stations".

Further, the controller 220 may include an MBS information table. The MBS information table as shown in FIG. 3 may include variety of information such as MBS zone IDs, user IDs, access node IDs and the number of service users of an MBS zone member base-station. The information stored in the MBS information table may be used by the controller 220 to manage a multicast group or to control a service access between the user and the controller 220 or between the gateway 213 and the controller 220 for the provision of the MBS. The information present in the MBS information table may be removed or updated under control of the controller 220.

The content server 230 stores diverse broadcast contents to be offered to the users that reside in the MBS zone. Then, the content server 230 provides content according to a request of the controller 220.

Figure 4:
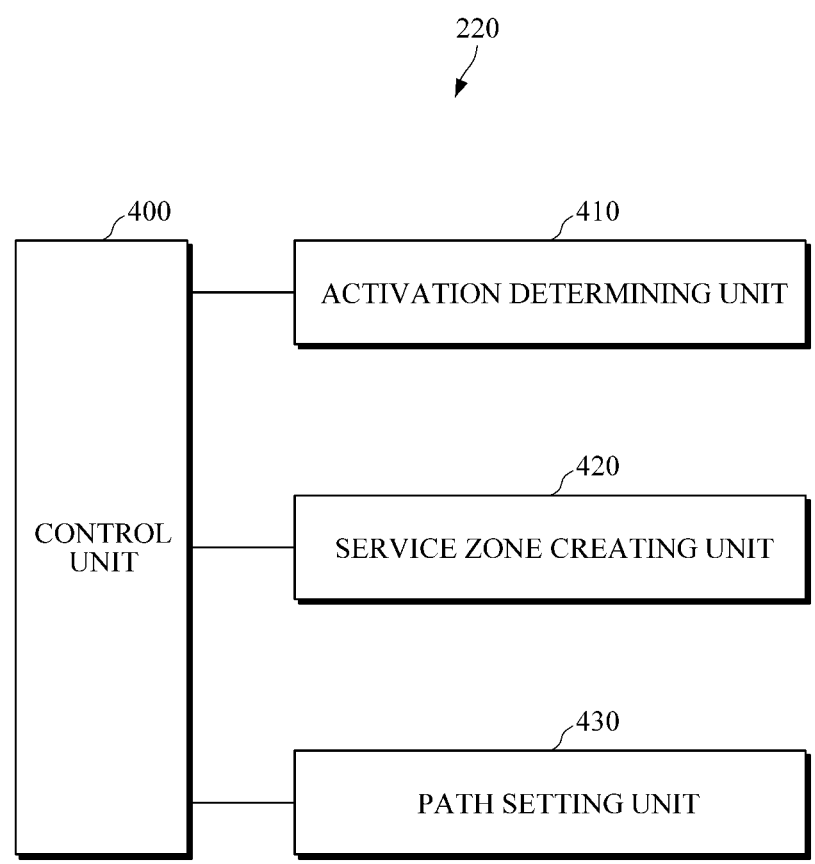
FIG. 4 is a diagram illustrating an example of a configuration of a controller shown in FIG. 2.

FIG. 4 illustrates an example of a configuration of a controller shown in FIG. 2. Referring to FIG. 4 in conjunction with FIG. 2, the controller 220 includes some or all of a control unit 400, an activation determining unit 410, a service zone creating unit 420, and a path setting unit 430.

The control unit 400 may be in charge of general control of a signal or information when the signal or information is processed cooperatively by the activation determining unit 410, the service zone creating unit 420, and the path setting unit 430, and the control unit 400 may convert the signal or information during the process.

The activation determining unit 410 may access the mobile communication network 210 and determine whether services requested by, for example, a first terminal and a second terminal have already been activated and may further determine whether the service requested by the second terminal has already been activated in an MBS zone and the second terminal is operating in the same service area where the first terminal resides. For example, as shown in FIG. 2, the first terminal may be a terminal possessed by Tom and the second terminal may be another terminal possessed by Alice or John. If the second terminal is John's terminal, a third terminal may thus be Alice's terminal, and if the second terminal is Alice's terminal, the third terminal may be accordingly John's terminal.

In response to the activation determining unit 410 determining that the service requested by the first terminal has not been activated, the service zone creating unit 420 may create a first service area (for example, ZONE 1) with respect to the first terminal, and extend the first service area to create a second service area (for example, ZONE 2) which is a new service area when the second terminal is operating in the same service area where the first terminal resides.

The path setting unit 430 may set data paths to the first base-station 211_1 and to the second base-station 211_2 for the MBS.

Although in the example shown in FIG. 4, all elements are coupled into one body or operate as a coupled unit, the embodiments of the present invention are not limited thereto. That is, it may be understood that one or more elements among all may be selectively coupled and operate in a coupled manner without departing from the scope of the present invention. In addition, each element may be implemented as an independent hardware unit, and, for example, the activation determining unit 410, the service zone creating unit 420, and the path setting unit 430 may be implemented as a computer program having program modules to operate all or some of functions of one or more pieces of hardware which are implemented by selectively combining some or all of the elements. Codes and code segments for accomplishing the above computer program may be easily constructed by programmers skilled in the art to which the present invention pertains. The computer program may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like.

Figure 5:
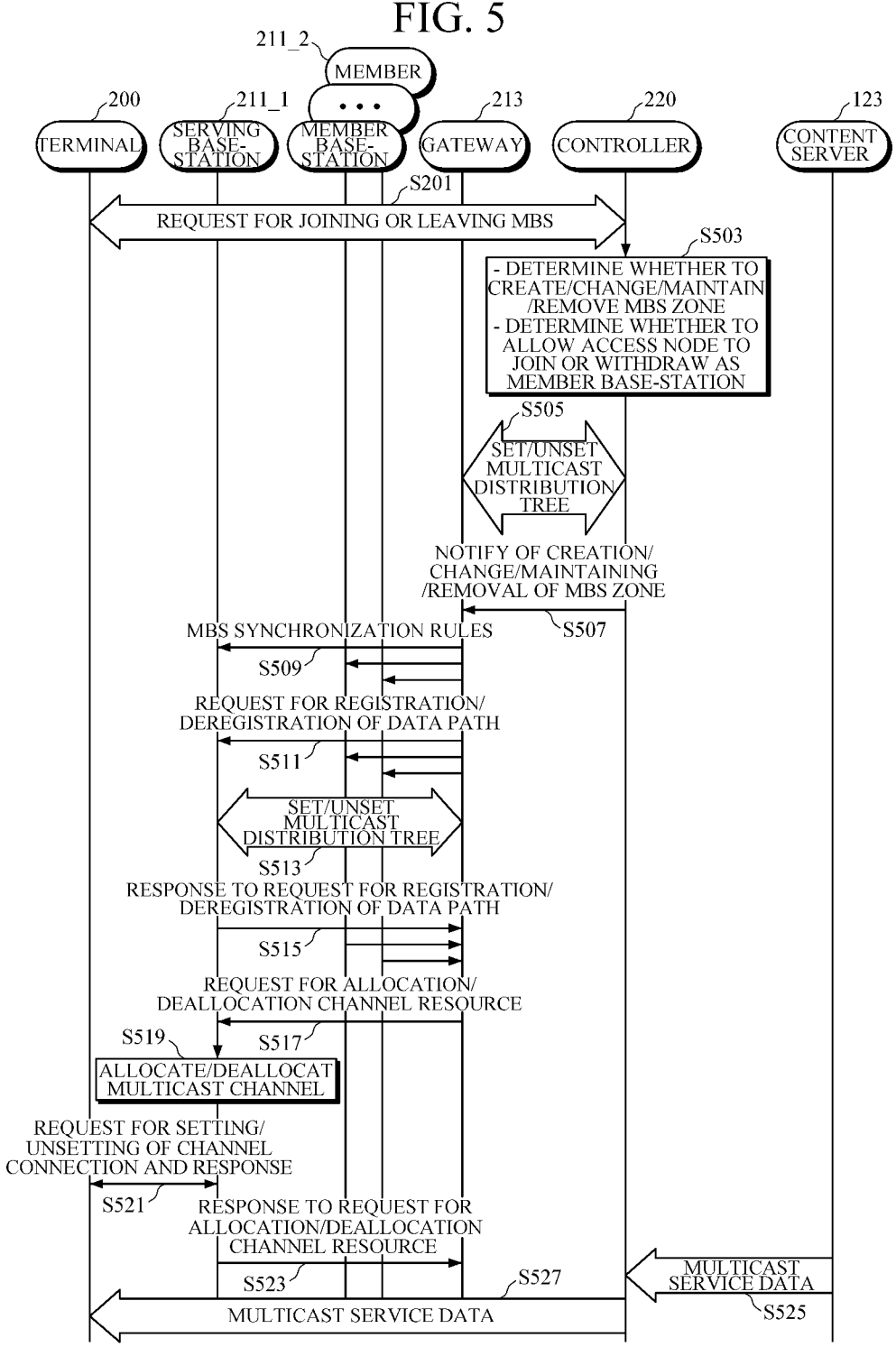
FIG. 5 is a flowchart illustrating an example of a broadcast service process of a system shown in FIG. 2.

FIG. 5 illustrates an example of a flowchart of a broadcast service process of a system shown in FIG. 2. Referring to FIG. 5 in conjunction with FIG. 2, the terminal 200 accesses the mobile communication network 210 over an adjacent access node, and requests the controller 220 to join or leave a multicast service in S501. The join request may be issued to initially create a service zone, and the leave request may be issued when the terminal 200 is already belonging to a service zone.

In response to the request for joining or leaving the multicast service, the controller 220 determines whether to create, change, maintain, or remove an MBS zone, and determines whether to allow the access node to join or withdraw as a member base-station in S503.

In addition, the controller 220 sets or unsets a multicast distribution tree with the gateway 213 in S505. At this time, the setting or unsetting of the distribution tree indicates procedures of the controller 220 registering or deregistering a multicast address according to standard protocol specifications.

Thereafter, the gateway 213 receives a notification of the creation, change, maintenance, or removal of an MBS zone from the controller 220 in S507. Though this operation, the controller 220 is enabled to make data access to the gateway 213 for multicast service data transmission.

In response to the above notification of the creation, change, maintenance, or removal of an MBS zone from the controller 220, the gateway 213 distributes own synchronization rules to the serving base-station 211_1 and the member base-station 211_2 in S509, and the gateway 213 requests the service base-station 211_1 and the member base-station 211_2 to register or deregister the data path in S511.

In addition, the gateway 213 and the access node as the serving base-station 211_1 perform procedures for setting and unsetting the multicast distribution tree in S513, and the serving base-station 211_1 issues a response to the registration or deregistration of the data path to the gateway 213 in S515. For example, in response to the synchronization rules from the gateway 213, the serving base-station 211_1 reserves a wireless link according to the synchronization rules, and makes data access to the gateway 213 to the gateway 213 to receive multicast service data.

Then, the serving base-station 211_1 receives a request from the gateway 213 to allocate or deallocate channel resources in S517, and in response to the request, the serving base-station 211_1 allocates or deallocates the multicast channel in S519.

The serving base-station requests the terminal 200 for channel connection setting or unsetting, and receives a response to the request from the terminal 200 in S521, and then provides the response to the channel resource allocation or deallocation to the gateway 213 in S523.

As a result of the above operations, the controller 220 relays the multicast service data from the content server 230 to the terminal 200 via the gateway 213 and the access node in S525 and S527.

The above procedures for the provision of the broadcast service will be described in detail in terms of each user with reference to FIGS. 5 and 2.

Tom's terminal 200 is connected to the first base-station 211_1 to access the mobile communication terminal 210. Tom's terminal 200 issues a request to the controller 220 to join the multicast service by use of identifier or identification information of the first base-station 211_1.

In response to the request for the multicast service, the controller 220 creates a first service area (ZONE 1) according to own decision rules. Then, the controller 220 generates an information table that includes information of the first service area, of the first base-station 211_1, and of Tom's terminal 200. Thereafter, the controller 220 transmits a notification of the creation of the first service area to the gateway 213. Accordingly, the controller 220 is enabled to make data access to the gateway 213 for the multicast service data transmission.

In response to the notification of the creation of the first service area from the controller 220, the gateway 213 distributes the synchronization rules to a member base-station of the first service area, that is, the first base-station 211_1, and makes data access, then, to the first base-station 211_1 for the multicast service data transmission.

In response to the synchronization rules from the gateway 213, the first base-station 211_1 of the first service area reserves a wireless link according to the synchronization rules, and the first base-station 211_1 makes data access to the gateway 213 and the Tom's terminal 200 to receive the multicast service data.

The controller 220 relays the multicast service data to the gateway 213 from the content server 230. In response to receiving the multicast service data, the gateway 213 may decide the time for the first base-station 211_1 to transmit the multicast service data simultaneously. Accordingly, the first base-station 211_1 transmits the multicast data simultaneously to all member base-stations within the first service area.

In response to receiving the multicast service data from the gateway 213, the member base-station transmits data within its cell coverage, so that Tom's terminal 200 can receive signals including the multicast service data from the member base-station.

For example, Alice's terminal 200, as a new user, is connected to the first base-station 211_1 to access the mobile communication network 210. In this example, Alice's terminal 200 issues a request to the controller 220 to join the multicast service by use of the identification information of the first base-station 211_1.

In response to the request for joining the multicast service, the controller 220 adds Alice's terminal 200 to the first service area according to own decision rules, and notifies the gateway 213 of the maintaining of the first service area.

In response to the notification of the maintaining of the first service area from the controller 220, the gateway 213 issues a request to the first base-station 211_1 to set a wireless channel between the base-station and the user. In response to the request for setting of the wireless channel from the gateway 213, the first base-station 211_1 reserves a wireless link, and makes data access to Alice's terminal 200 to receive the multicast service data.

As a result, Alice's terminal 200 is enabled to receive signals including the multicast service data from the first base-station 211_1.

As yet another new terminal, John's terminal 200 is connected to the second base-station 211_1 to access the mobile communication network 210. John's terminal 200 issues a request to the controller 220 to join the multicast service by use of the identification information of the second base-station 211_2.

In response to the request for joining the multicast service, the controller 220 adds John's terminal 200 and the second base-station 211_2 to the first service area according to own decision rules. The first service area is substituted by the second service area that includes the first base-station 211_1 and the second base-station 211_2 as new member base-stations. In addition, the controller 220 notifies the gateway 213 of a configuration of the second service area, and makes data access to the gateway 213 for the multicast service data transmission.

In response to the notification of the configuration of the second service area, the gateway 213 distributes synchronization rules among the first and the second base-stations 211_1 and 211_2 which are member base-stations of the second service area. In addition, the gateway 213 transmits a request for setting a wireless channel between the base-station and the user. Then, the gateway 213 is enabled to make data access to the second base-station 211_2 for multicast service data transmission.

In response to the request for the synchronization rules and the setting of the wireless channel, the first base-station 211_1 and the second base-station 211_2 which are member base-stations of the second service area reserve a wireless link according to the synchronization rules, and data access to the second base-station 211_2 is made for John's terminal 200 to receive the multicast service data. Thereafter, the new member base-stations, the first and the second base-stations 211_1 and 211_2, make data access to the gateway 213 to receive the multicast service data.

In response to the multicast service data from the content server 230 via the controller 220, the gateway 213 transmits the data to the first and the second base-stations 211_1 and 211_2 which are the member base-stations within the second service area.

In response to receiving the multicast service data, the first and the second base-stations 211_1 and 211_2 transmit the data within their cell coverage, so that John's terminal 200 can receive signals including the multicast service data from the first and the second base-stations 211_1 and 211_2.

Figure 6:
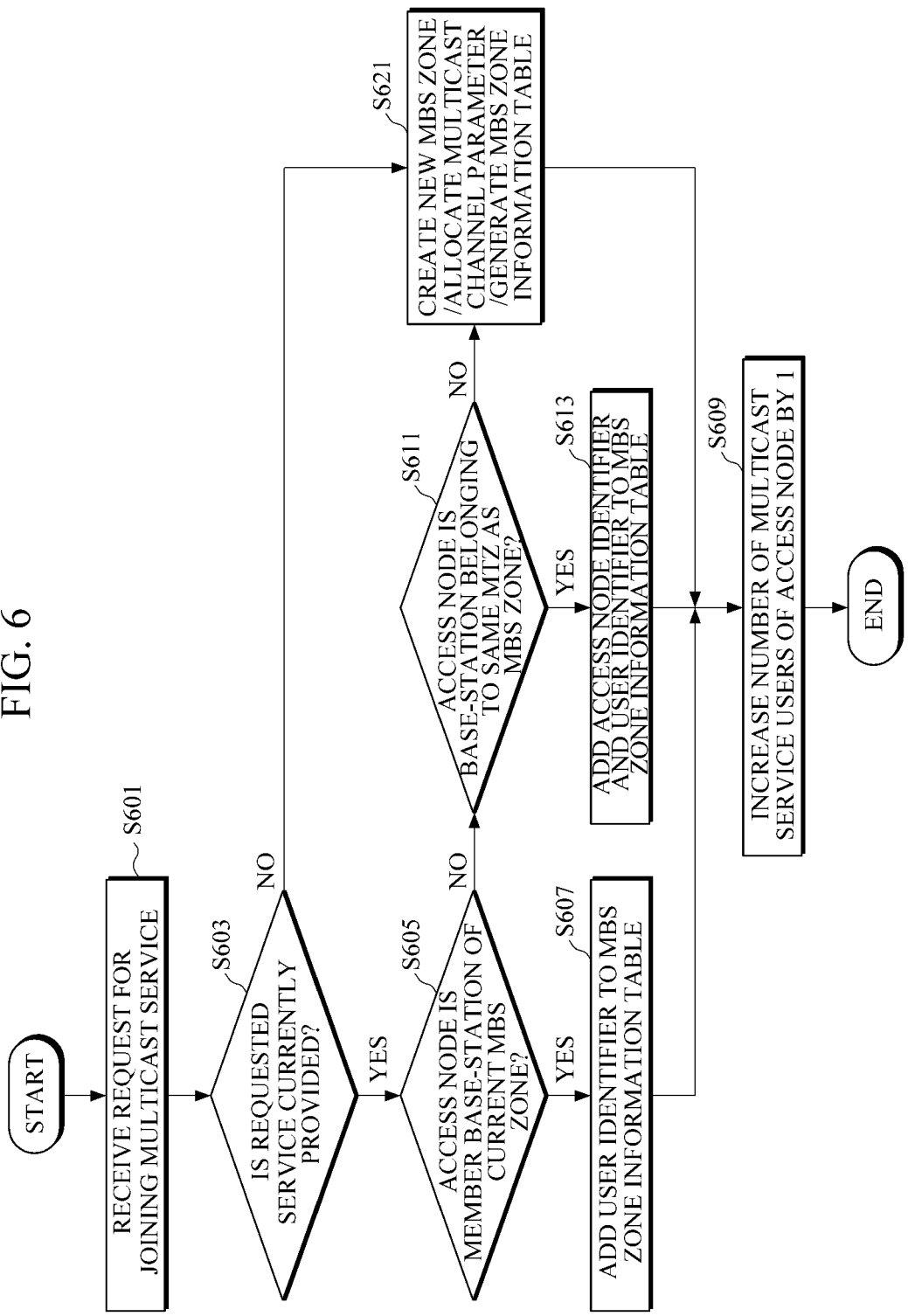
FIG. 6 is a flowchart illustrating an example of an operating process of the controller shown in FIG. 2.

FIG. 6 illustrates an example of a flowchart of an operating process of the controller shown in FIG. 2. In FIG. 6, the controller receives a request from a terminal to join a multicast service.

Referring to FIG. 6 in conjunction with FIG. 2, the controller 220 receives a request from the terminal 200 to join a multicast service in S601. To this end, the terminal 200 is connected to an adjacent access node to access the mobile communication network 210.

In response to the service request being received from the terminal 200, the controller 220 determines whether the requested service has already been offered or not in S603.

In response to the determination being made that the requested service is a multicast service currently offered, the controller further determines whether the access node is a member base-station of a current multicast zone in S605.

In response to the determination being made that the access node is a member base-station, the controller 220 stores user identification information of the terminal 200 in an MBS zone information table in S607.

Then, the controller increases the number of multicast service users of the access node in S609.

In response to the determination being made in S605 that the access node is not a member base-station, the controller 220 determines whether the access node is belonging to the MBS zone and a multicast transmission zone (MTS) in S611.

In response to the determination being made that the access node is belonging to the MTS, the controller 220 stores the identification information of the access node and of the terminal user in the MBS zone information table in S613, and the flow proceeds to S609.

On the contrary, in response to the determination being made in S603 that the requested service is not a service being currently provided, or the determination being made in S611 that the access node is not belonging to the MTZ, the controller 220 creates a new multicast zone and makes a new multicast service information table in S621. The information table includes identification information of the MBS zone, the access node and the user.

FIG. 7 illustrates an example of a flowchart of an operating process of the controller shown in FIG. 2. In FIG. 7, the controller receives a request from a terminal to leave a multicast service.

Referring to FIG. 7 in conjunction with FIG. 2, the controller 220 receives a request from the terminal 200 to leave a multicast service in S701.

In response to the request from the terminal to leave the multicast service, the controller 220 checks information of a corresponding MBS zone in S703, and reduces the number of service users connected to an access node in S705.

In response to the decrease in the number of service users, the controller 220 determines whether the number of service users connected to the corresponding access node is zero in S707.

If the number is not zero, the controller 220 maintains the configuration of the MBS zone in S709. Otherwise, the controller 220 determines whether the total number of service users in the MBS zone is zero in S711.

If the total number of service users is zero, the controller 220 removes the MBS zone to terminate the process in S713. Otherwise, the controller 220 changes the configuration of the MBS zone in S715 and excludes the access node from member base-stations that are included in the MBS zone to terminate the process in S717.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

INDUSTRIAL APPLICABILITY

The present invention can be efficiently applied to a system and a method for a mobile broadcast service, a controller, a method for driving the controller, and a non-transitory computer-readable medium. According to the present invention, a base-station that forms an MBS zone is dynamically changed to another base-station according to whether a user joins or leaves a multicast service, and thus it is possible to provide an MBS to all MBS users within the same MBS zone using a relatively small amount of wireless resources, when compared to a method of configuring a multicast service area with a fixed shape. Further, in a case where a plurality of base-station form an MBS zone, it may be possible to increase an MBS reception quality using macro diversity, as used in a fixed MBS zone.

The invention claimed is:

1. A system for a mobile broadcast service comprising:
    a content server configured to provide data and service information which are related to at least one mobile service of a multicast/broadcast service (MBS);
    a node apparatus configured to reserve a dedicated wireless channel to transmit data in response to a request from a user for the mobile service, and to transmit multicast data using the dedicated wireless channel;
    a gateway configured to perform data tunneling to the node apparatus for an access to the MBS, to request for setting or unsetting of a wireless channel between the node apparatus and a terminal of the user, and to control data synchronization of the node apparatus in a service zone in which the MBS is activated; and
    a controller configured to manage at least one of a service access to the gateway for transmitting the data, a group of node apparatuses, and profiles of the user and the service and to distribute the data and the service information to the gateway,
    wherein the service zone in which the MBS is activated is formed only with base stations having a user demand for the at least one mobile service.

2. The system of claim 1, wherein the node apparatus is configured to be connected to one or more terminals and the terminals receive the multicast data in response to the request for the mobile service.

3. The system of claim 2, wherein the profile of the user includes information about the terminal, and the profile of the service is information related to change, maintaining, and removal of the service zone.

4. The system of claim 1, wherein the controller is configured to manage the group of node apparatuses by increasing or reducing a number of node apparatuses within the service zone.

5. A controller comprising:
    at least one processor that processes computer executable program code embodied in computer readable storage media, the computer executable program code comprising:
    activation determining program code that determines whether a mobile service requested by a first terminal or a second terminal is activated when the first terminal or the second terminal requests for the mobile service by accessing a mobile communication network, and that further determines whether the mobile service requested by the second terminal has already been activated in a mobile service transmission zone and the second terminal is operating in the same service area where the first terminal resides;
    service zone creating program code that, in response to a determination being made that the mobile service requested by the first terminal is not activated, creates a first service area for the first terminal, and, in response to a determination being made that the second terminal is operating in the same service area where the first terminal resides, extends the first service area to create a second service area; and
    path determining program code that sets data paths to a first node apparatus and to a second node apparatus for the mobile service.

6. The controller of claim 5, wherein the mobile service transmission zone is a multicast service transmission zone (MTZ) in which a group of the first node apparatus and the second node apparatus that can join a multicast service can be provided with the multicast service.

7. The controller of claim 5, wherein the first node apparatus and the second node apparatus use the same physical channel to, respectively, provide data of the mobile service to the first terminal and the second terminal.

8. A method for a mobile broadcast service in a system comprising a node apparatus, a gateway, a controller and a content server so as to process data and service information which are related to at least one mobile service of a multicast/broadcast service (MBS), the method comprising:
   reserving, at the node apparatus, a dedicated wireless channel to transmit data to a user in response to a request from the user for the mobile service and transmitting multicast data over the dedicated wireless channel;
   performing, at the gateway, data tunneling to the node apparatus for an access to the MBS, requesting for setting or unsetting of a wireless channel between the node apparatus and a terminal of the user, and controlling data synchronization of the node apparatus in a service zone in which the MBS is activated; and
   managing, at the controller, at least one of a service access to the gateway for transmitting the data, a group of node apparatuses, and profiles of the user and the service and distributing the data and the service information to the gateway,
   wherein the service zone in which the MBS is activated is formed only with base stations having a user demand for the at least one mobile service.

9. A method for a mobile broadcast service in a system comprising a node apparatus, a gateway, a controller and a content server so as to process data and service information which are related to at least one mobile service of a multicast/broadcast service (MBS), the method comprising:
   receiving, at the controller, a request from a user to join or leave the mobile service, determining creation, change, maintaining, or removal of a service zone in which the MBS is activated in response to the received request, and determining whether to allow the node apparatus to join or leave the mobile service;
   setting or unsetting, at the controller, a service distribution tree to distribute the MBS to the gateway and issuing a notification of creation, change, maintaining, or removal of the service zone;
   transmitting, at the gateway, synchronization rules related to the MBS to the node apparatus, setting or unsetting a service distribution tree to distribute the MBS to the node apparatus, issuing a request for registration or deregistration of a data path to the node apparatus or a request for allocation or deallocation of a channel resource and receiving a response to the request for registration or deregistration of the data path or a response to the request for allocation or deallocation of the channel resource;
   allocating or deallocating, at the node apparatus, the channel resource for the MBS, and issuing a request to a terminal of the user for setting or unsetting of channel connection and receiving a response to the request for setting or unsetting of the channel connection; and
   relaying, at the controller, the data from the content server to the terminal.

10. A method for a mobile broadcast service in a system comprising a node apparatus, a gateway, a controller and a content server so as to process data and service information which are related to at least one mobile service of a multicast/broadcast service (MBS), the method comprising:
   in response to receiving a request from a first terminal for the MBS, creating, at the controller, a first service area based on decision rules, and issuing a notification of the creation of the first service area to the gateway;
   in response to receiving the notification of the creation of the first service area, distributing, at the gateway, synchronization rules to a first node apparatus, and making an access to the first node apparatus to transmit the data; and
   in response to receiving the synchronization rules, reserving, at the first node apparatus, a wireless link according to the synchronization rules and making an access to the gateway to receive the data,
   wherein the first service area in which the MBS is activated is formed only with base stations having a user demand for the at least one mobile service.

11. The method of claim 10, wherein the issuing of the notification to the gateway comprises generating, at the controller, an information table that includes identification information of the first service area, the first node apparatus and the first terminal.

12. The method of claim 10, further comprising: in response to receiving a request from a second terminal for the MBS, adding, at the controller, the second terminal to the first service area based on the decision rules.

13. The method of claim 12, further comprising:
   in response to receiving a request from a third terminal for the MBS, creating, at the controller, a second service area by adding a second node apparatus that the second terminal and the third terminal access to the first service area based on the decision rules;
   issuing, at the controller, a notification of the creation of the second service area to the gateway;
   in response to receiving the notification of the creation of the second service area, distributing, at the gateway, the synchronization rules among the first node apparatus and the second node apparatus; and
   in response to receiving the synchronization rules, reserving, at the first node apparatus and the second node apparatus, a wireless link and making an access to the gateway to receive the data.

14. A method for driving a controller, comprising:
   determining whether a mobile service requested by a first terminal or a second terminal is activated when the first terminal or the second terminal requests for the mobile service by accessing a mobile communication network, and further determining whether the mobile service requested by the second terminal has already been activated in a mobile service transmission zone and the second terminal is operating in the same service area where the first terminal resides;
   in response to a determination being made that the mobile service requested by the first terminal is not activated, creating a first service area for the first terminal, and in response to a determination being made that the second terminal is operating in the same service area where the first terminal resides, extending the first service area to create a second service area; and
   setting data paths to a first node apparatus and to a second node apparatus for the mobile service.

15. A method for driving a controller that interconnects with a node apparatus to process data and service information which are related to at least one mobile service of a multicast/broadcast service (MBS), the method comprising:
   receiving a request from a terminal to join the mobile service, and determining whether the requested mobile service is the MBS that is currently provided;

in response to a determination being made that the requested service is the currently provided MBS, further determining whether the node apparatus is a member apparatus that forms a service zone in which the MBS is provided;

in response to a determination being made that the node apparatus is the member apparatus of the service zone, storing identification information of the terminal and increasing a number of users of the node apparatus for the MBS.

16. The method of claim 15, further comprising:

in response to a determination being made that the node apparatus is not the member apparatus of the service zone, determining whether the node apparatus is belonging to the same multicast transmission zone (MTZ) as the service zone; and in response to a determination being made that the node apparatus is belonging to the MTZ, storing identification information of the node apparatus and the terminal, and increasing the number of users of the node apparatus for the MBS.

17. The method of claim 16, further comprising: in response to a determination being made that the mobile service is not the currently provided MBS or that the node apparatus is not belonging to the MTZ, creating a new service zone and increasing the number of users of the node apparatus for the MBS.

18. The method of claim 17, wherein the creating of the new service zone comprises generating an information table to store identification information of the new service zone, the node apparatus and the terminal.

19. A method for driving a controller that interconnects with a node apparatus to process data and service information which are related to at least one mobile service of a multicast/broadcast service (MBS), the method comprising:

receiving a request from a terminal(s) to leave the mobile service, and checking information of a service zone, in which the MBS is provided, based on the request;

reducing a number of service users to be provided with the MBS through the node apparatus by a number of the terminals, each issuing the request to leave the mobile service, according to the checking result, and determining whether the number of the service users is zero;

in response to a determination being made that the number of the service users is zero, further determining whether a total number of service users within the service zone is zero;

in response to a determination being made that the total number of service users is not zero, changing a configuration of the service zone and excluding the node apparatus from member apparatuses for the provision of the MBS.

20. The method of claim 19, further comprising: in response to a determination being made that the number of the service users to be provided with the MBS through the node apparatus is not zero, maintaining the configuration of the service zone; and in response to a determination being made that the total number of service users within the service zone is zero, removing the service zone.

* * * * *